US009438794B2

(12) United States Patent
Mikes

(10) Patent No.: US 9,438,794 B2
(45) Date of Patent: Sep. 6, 2016

(54) METHOD AND APPARATUS FOR DISTRIBUTED IMAGE PROCESSING IN CAMERAS FOR MINIMIZING ARTIFACTS IN STITCHED IMAGES

(71) Applicant: OmniVision Technologies, Inc., Santa Clara, CA (US)

(72) Inventor: Gabor Mikes, Oslo (NO)

(73) Assignee: Omnivision Technologies, Inc., Santa Clara, CA (US)

( * ) Notice: Subject to any disclaimer, the term of this patent is extended or adjusted under 35 U.S.C. 154(b) by 458 days.

(21) Appl. No.: 13/926,678

(22) Filed: Jun. 25, 2013

(65) Prior Publication Data

US 2014/0375759 A1 Dec. 25, 2014

(51) Int. Cl.

| | |
|---|---|
| ***H04N 7/12*** | (2006.01) |
| ***H04N 11/02*** | (2006.01) |
| ***H04N 11/04*** | (2006.01) |
| ***H04N 5/232*** | (2006.01) |

(52) U.S. Cl.
CPC ................................ *H04N 5/23238* (2013.01)

(58) Field of Classification Search
None
See application file for complete search history.

(56) References Cited

U.S. PATENT DOCUMENTS

| | | | | |
|---|---|---|---|---|
| 5,323,204 A * | 6/1994 | Wheeler | G03B 17/24 | 396/213 |
| 5,633,678 A * | 5/1997 | Parulski | G06F 17/30265 | 348/231.5 |
| 8,194,993 B1 * | 6/2012 | Chen | G06T 5/006 | 348/231.6 |
| 8,340,453 B1 * | 12/2012 | Chen | G06T 5/002 | 382/254 |
| 2003/0133008 A1 * | 7/2003 | Stephenson | H04N 5/2251 | 348/47 |
| 2006/0038894 A1 * | 2/2006 | Chan | H04N 5/232 | 348/222.1 |
| 2006/0077259 A1 * | 4/2006 | Knoedgen | H04N 5/4448 | 348/187 |
| 2007/0046787 A1 * | 3/2007 | Sasinowski | H04N 9/735 | 348/223.1 |
| 2008/0247672 A1 * | 10/2008 | Kaplinsky | G06T 3/4015 | 382/300 |

(Continued)

FOREIGN PATENT DOCUMENTS

CN 102118558 A 7/2011

OTHER PUBLICATIONS

Taiwanese Patent Application 103121093 Office Action dated Jan. 29, 2016, received Feb. 23, 2016, 6 pages.

(Continued)

*Primary Examiner* — Frederick Bailey
*Assistant Examiner* — Talha M Nawaz
(74) *Attorney, Agent, or Firm* — Lathrop & Gage LLP

(57) ABSTRACT

A method for coordinated adjustment of a first image captured by a first camera and a second image captured by a second camera includes determining a first set of image processing parameters from the first image and a second set of image processing parameters from the second image, transmitting the first set of image processing parameters to a master, the master not being the first camera; combining at least the first and second sets of processing parameters into a combined or composite set of parameters; transmitting the composite parameters from the master to the first camera; and using a processor of the first camera to apply the composite parameters to the first image, and a processor of the second camera to apply composite parameters to the second image. An apparatus has at least two cameras configured to implement the method.

19 Claims, 3 Drawing Sheets

(56) References Cited

U.S. PATENT DOCUMENTS

2009/0284601 A1* 11/2009 Eledath .................. G06K 9/209 348/157
2011/0310219 A1* 12/2011 Kim ................. G08B 13/19643 348/36
2013/0121525 A1* 5/2013 Chen ..................... G06T 3/0062 382/100
2013/0124471 A1* 5/2013 Chen .................. H04N 5/23238 707/624
2015/0296193 A1* 10/2015 Cote ...................... H04N 9/646 382/167

OTHER PUBLICATIONS

Taiwanese Patent Application 103121093 Office Action dated Sep. 15, 2015, 14 pages.

* cited by examiner

METHOD AND APPARATUS FOR DISTRIBUTED IMAGE PROCESSING IN CAMERAS FOR MINIMIZING ARTIFACTS IN STITCHED IMAGES

BACKGROUND

Many electronic cameras include firmware adapted to determine appropriate white-balance, or color adjustment, parameters and to perform an automatic white balance of an image.

In some prior systems, each camera of a group of cameras used to capture images intended for stitching into panoramic or 360-degree surrounding images, or wide format images compatible with the formats often used in motion picture theaters, has been permitted to determine its color-balance and/or exposure-control parameters individually. Once each camera has identified these parameters, they are applied at that camera to images photographed by that camera before the images are transferred to the host system. When this occurs, differences between color-balance and/or exposure control parameters determined by each camera can cause visible artifacts in the stitched image—especially at boundaries where individual camera images are spliced and large uniformly-colored objects or background crosses those boundaries. For example, a splice line with sky of different color shades or brightness may become visible if blue sky background is processed by each camera with different color-balance and/or exposure parameters.

Should additional corrections for color, brightness, and contrast be performed on the host for each camera image to be spliced, substantial processing time on the host may be required.

SUMMARY

A method for coordinated adjustment of a first image captured by a first camera and a second image captured by a second camera includes determining a first set of statistics image processing parameters from the first image and a second set of statistics image processing parameters from the second image, transmitting the first set of statistics image processing parameters to a master, the master not being the first camera; combining at least the first and second sets of statistics processing parameters into a combined or composite set of parameters; determining a set of adjustment parameters from the combined set of statistics; transmitting the set of composite parameters from the master to the first camera; and using a processor of the first camera to apply the set of composite parameters to the first image, and a processor of the second camera to apply the set of composite parameters to the second image.

An apparatus has at least two cameras configured to implement the method.

In another embodiment, an apparatus for generating stitched images includes a first and a second camera, each camera having a processor; a memory system coupled to the processor, the memory system including a firmware memory; a communications subsystem coupled to the processor; and a coordination and image adjustment firmware in the firmware memory. The coordination firmware has machine readable instructions for transmitting image processing parameters derived from an image captured by the camera to a master, and receiving a set of parameters for adjustment of the image. The image adjustment firmware has machine readable instructions for performing at least one of color-balance adjustment, contrast adjustment, and brightness adjustment.

DETAILED DESCRIPTION OF THE EMBODIMENTS

Figure 2:
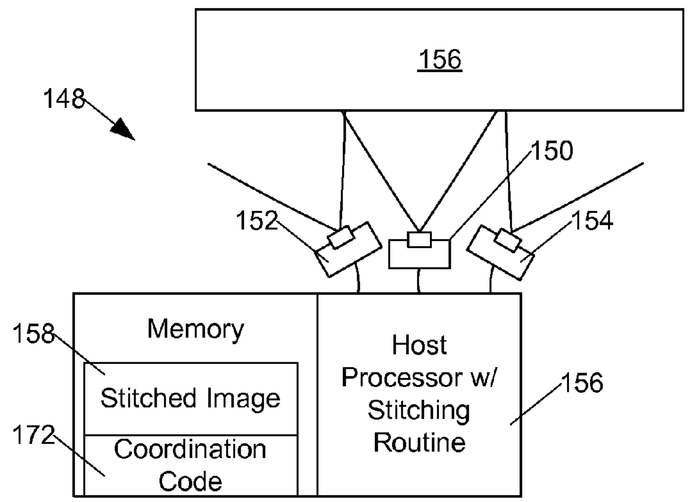
FIG. 2 is a block diagram of a multicamera system for capturing images suitable for stitching.

A camera 100 (FIG. 1) include a lens system 102 that focuses an image of any imaging subject on an image sensor 104 that is configured to capture an electronic image of the subject. In many cameras, image sensor 104 and/or lens system 102 are equipped with an exposure control apparatus, which typically includes exposure control electronics 106 and may include one or both of adjustable electronic and mechanical shutters, and may further include an electromechanical diaphragm 108 for adjusting light received by the sensor. Each camera typically also has at least one processor 110 that directs its operation and performs image processing under control of firmware in a firmware memory 112 in a memory system 114 that is coupled to processor 110. Memory system 114 in many cameras also includes a RAM memory 116 for storing temporary information such as uncompressed and partially compressed images, raw camera images, and intermediate images produced during color, brightness, and contrast correction, and removable and/or fixed nonvolatile memory 118, such as FLASH or EPROM memory, for storing compressed images. Cameras also often, but not always, have a display 120, which may be used as a viewfinder, for displaying images, and for providing menu functionality for interaction with a user along with one or more buttons and switches of controls 122. Cameras also often have communications subsystems 124 coupled to their processor 110, such as an interface for providing images to a host processor or for connecting to a printer for printing images. Some or all components of camera system 100 may be integrated on a single "SOC" camera system chip, including sensor 104, exposure control electronics 106 with electronic shutters, processor 110, communications subsystem 124, and portions of memory system 114.

In various embodiments, communications subsystem 124 is an USB interface, in other embodiments a wired network interface such as 10/100 Base-T Ethernet, in other embodiments a digital wireless transceiver compatible with a communications protocol such as those known in the art including Bluetooth, 802.11G or 802.11N, and in other embodiments an infrared optical transceiver.

Many cameras include in firmware memory 112 firmware for determining an optimum exposure and for using exposure control electronics 106 to adjust exposure—including effective shutter speed—accordingly.

Figure 1:
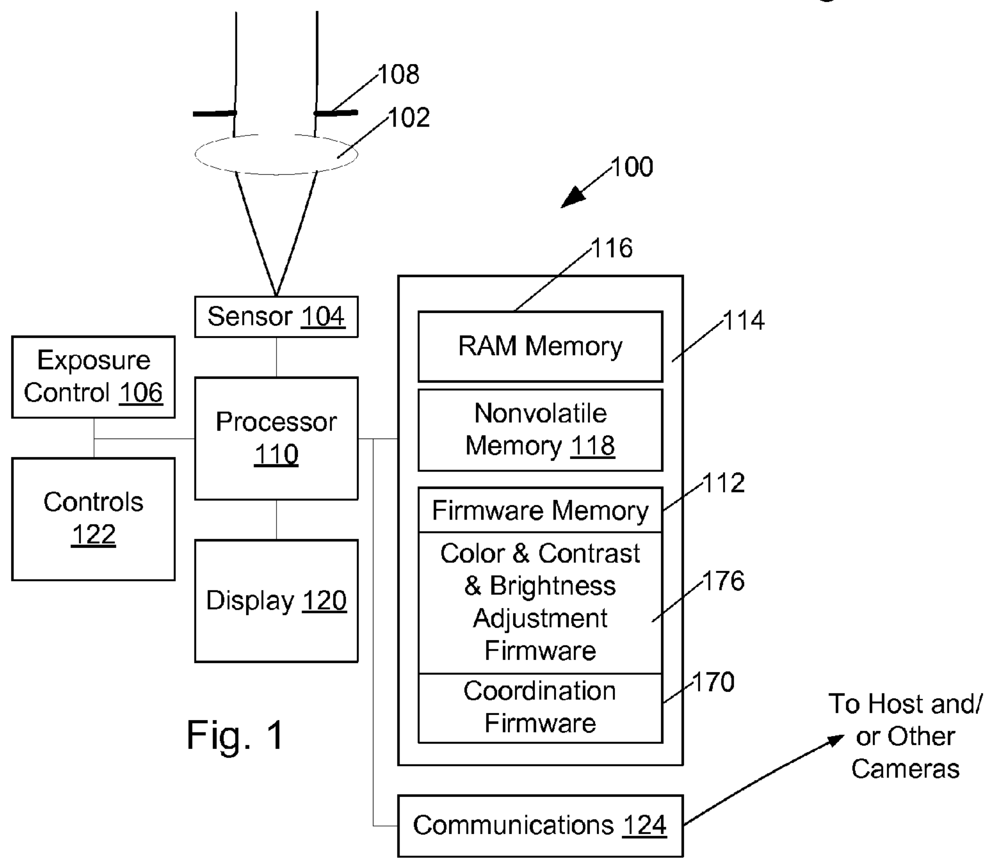
FIG. 1 is a block diagram of an electronic camera adapted for coordinated capture of stitchable images.

When broad final images of a scene are desired, such as panoramic or 360-degree surrounding images, or images compatible with the wide formats often used in motion picture theaters, a system 148 (FIG. 2) having at least a first and second, or more, narrower-format cameras 150, 152, 154 may be used to photograph the scene 156 from different angles, as illustrated in FIG. 1, such that images captured by each pair of cameras 150, 152 and 152, 154 overlap. Images of scene 156 as viewed from each camera 150, 152, 154 are then read to a host system 156, using each camera's communications subsystems 124, and "stitched" to make a composite or mosaic image 158 that combines portions of the scene imaged by each of the cameras to give a broad final image of the scene.

Figure 3:
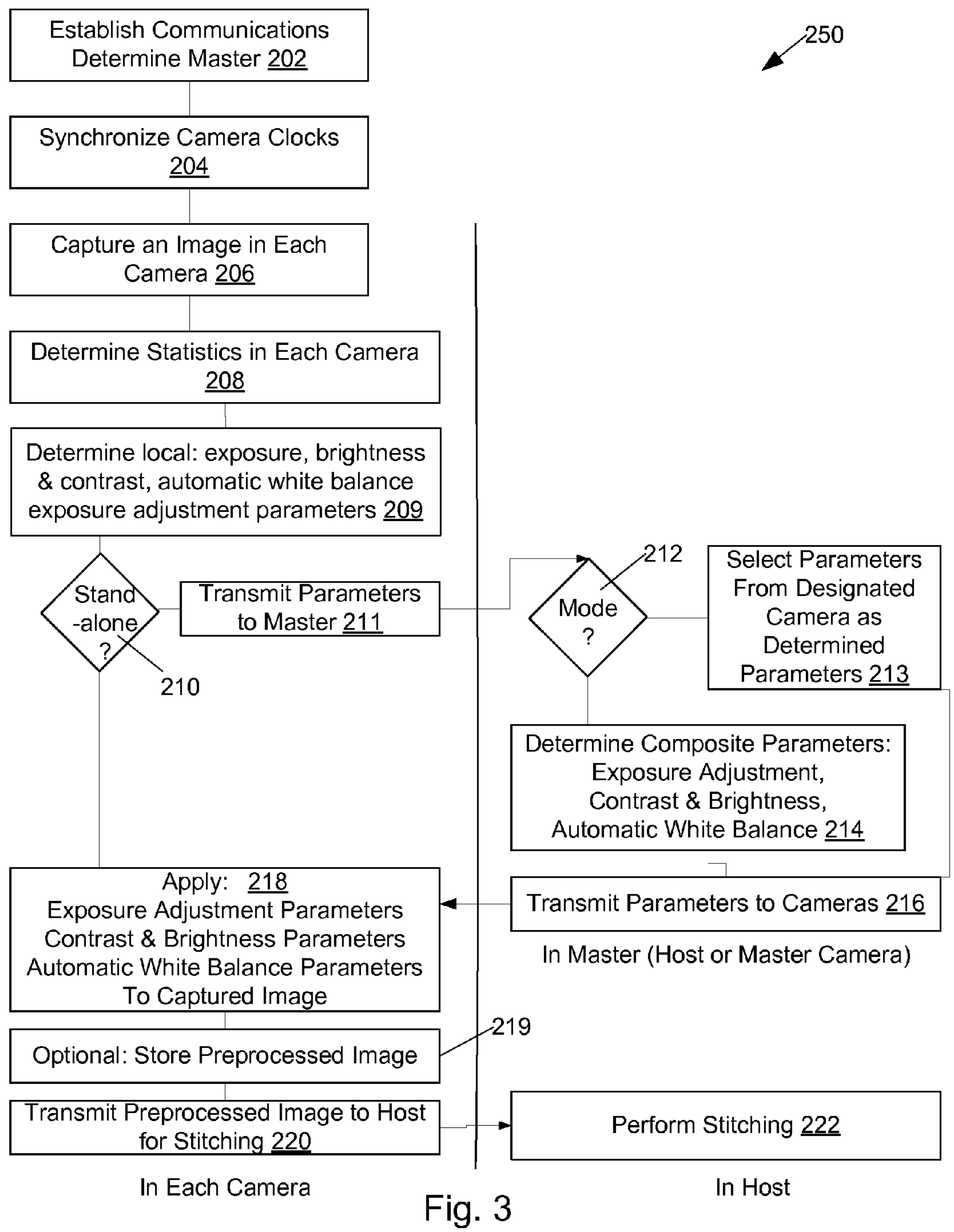
FIG. 3 is a flowchart of a method for distributing processing to individual cameras and for coordinating automatic white balancing, and contrast and brightness adjustment, of captured images suitable for stitching.

FIG. 3 shows a method 200 for distributed processing of coordinated automatic white balancing, and contrast and brightness adjustment, of captured images suitable for stitching. Method 200 begins with establishing 202 communications between two or more cameras 100, and, in some embodiments, a host. These communications are controlled by machine readable instructions of a coordination firmware 170 located in each camera firmware memory 112 and a coordination firmware 172 in the host. Communications between cameras is carried out using the communication subsystem 124 of each camera, and if a host is present a compatible communications interface of the host. If a host is present, the host is determined to be a master. In embodiments where a host is not present during image processing—such as those where images are stored in the cameras for later download to a host, a particular camera of the cameras is designated as master.

Once communications are established, clocks of the cameras, and host if present, are synchronized 204 so that images may be captured simultaneously in each camera.

An image is then captured 206 by each camera, and a local set of statistics are determined 208 from each image in the camera within which it resides. Among the statistics determined is a histogram of intensity, such as may be useful for automatic adjustment of brightness and contrast to optimize dynamic range in stored images. Also determined are statistics suitable for use in automatic white balancing, for example in a system that automatically white balances to a frame average of grey, this may include an average and sum of all red-channel values, an average and sum of all blue-channel values, and an average and sum of all green-channel values. In a particular embodiment, the statistics include a histogram of all red-channel values, a separate histogram of all blue-channel values, and a histogram of all green-channel values.

Each camera then uses these statistics to determine 209 a set of local parameters for image processing, including automatic adjustment of brightness and contrast to optimize dynamic range in stored images, and in an embodiment for white balancing. In a particular embodiment, the parameters for adjustment of brightness and contrast include an offset and scale factor for each color channel determined from the histogram of pixel intensity of that color channel, the offset and scale factor can be applied to pixel intensities to optimize digital image dynamic range by applying the formula $$\text{Intensity(optimized)}=\text{Value(pixel)}*\text{Scale Factor}-\text{Offset}. \quad \text{(Equation 1)}$$

In an alternative embodiment, the offset and scale factor are applied to pixel intensities to optimize digital image dynamic range by applying the formula $$\text{Intensity(optimized)}=(\text{Value(pixel)}-\text{Offset})*\text{Scale Factor}. \quad \text{(Equation 2)}$$

In an embodiment, the scale factor and offset for each channel are adjusted such that application of the scale factor and offset will perform a white balancing also.

The scale factor and offset of the image, or of each color plane of each image, are provided with the adjusted image or color image planes to permit reconstruction and display of the image.

In a particular embodiment, each camera determines a color temperature by statistically analyzing the average and sum of all red, green, and blue-channel values. This color temperature is usable as an automatic white-balancing parameter for image processing.

In another particular embodiment, a 3×3 color correction matrix is generated in each camera, the 3×3 matrix having elements determined to, when the matrix is cross-multiplied by the 3-valued vector (Red, Green, Blue) determined for each pixel, result in a white-balanced image. In a particular embodiment, the 3×3 matrix is be a diagonal matrix having as terms simple scaling values for the red, green, and blue channels; in other embodiments the matrix has additional terms that permit correction for imperfections in color filters of the camera.

The camera then determines if 210 it is in a stand-alone or in a multi-camera cooperative mode. The stand-alone mode is used by the camera if no other cameras or host are communicating with the camera, and the cooperative mode is used when there is at least one other camera or a host communicating with the camera for capturing portions of a scene for stitching.

In the cooperative mode, each local sets of parameters for image processing are then transmitted 211 from each camera, operating under control of coordination firmware 170, to the master camera, or to the host if a host is present. In embodiments that determine a color temperature, the color temperature is among the parameters transmitted to the master or host. Similarly, in embodiments determining a 3×3 color correction matrix, the color correction matrix is among the parameters transmitted to the master or host.

The master or host, respectively operating under control of coordination firmware 170 or coordination code 172, then determines if 212 the multicamera system 148 (FIG. 2) of which it is a part is operating in a dominant-camera mode, or in a full image mode. If the system is in dominant camera mode, the master or host selects 213 those parameters for image processing sent to it by a particular dominant camera as a determined parameter set for image processing. In a particular embodiment, the dominant camera is a center camera 150 of a 3-camera panoramic multicamera system 148 (FIG. 2).

If 212 the multicamera system 148 is in full-image mode, the master or host processes the not sets of statistics from each camera, but the local sets of parameters for image processing, to determine 214 a composite set of parameters for image processing for use in adjusting the images. In various embodiments, the composite parameters include one or more of scene-wide Exposure Adjustment Parameters, Contrast & Brightness or Histogram Stretching Parameters, and Automatic White Balance Parameters. In systems where each camera determines a color temperature, the composite parameters include an average color temperature determined by averaging the color temperature received from the cameras. In systems where each camera determines a 3×3 color correction matrix, the composite parameters include a composite color correction matrix. In a particular embodiment, each term of the composite color correction matrix is determined by averaging corresponding terms in each color correction matrix received from the cameras.

The determined set of parameters, which in dominant camera mode is selected 213 from the parameters provided by the cameras to the master camera or host, and in full-image mode is the determined 214 composite parameters, is then transmitted 216 to all cameras 150, 152, 154 of the multicamera system 148 that are viewing the scene. The coordination firmware 170 of each camera includes instructions for receiving these adjustment parameters transmitted by the master camera or host as received parameters.

If 210 the camera is in stand-alone mode, the camera's processor 110, operating under control of color and contrast adjustment firmware 176, applies 218 the determined local set of parameters 209 to adjust the image. In cooperative mode, the camera's processor 110, operating under control of color and contrast adjustment firmware 176, applies the received parameters to adjust the image captured by that camera. In executing adjustment firmware 176, the processor adjusts the image for exposure, contrast and brightness, and white balance to form a preprocessed image in RAM memory 116. In embodiments, the preprocessed image may also be compressed.

In embodiments where the host is not connected to the cameras during the time images are captured, the preprocessed images are stored 219 in memory 114 until such time as the host is connected to the cameras and the images can be transmitted to the host. In particular embodiments, the preprocessed images are stored 219 in nonvolatile memory 118.

The preprocessed images from each camera are then transmitted 220 to the host, which then performs stitching 222, including merging the individual camera images into a stitched image.

When fewer bits are available to store or compress each intensity value of pixels in an image than originally captured at a photosensor, it is desirable to offset and scale (or stretch) those intensity values so that the full dynamic range of the available bits to avoid unnecessary loss of resolution.

Figure 4:
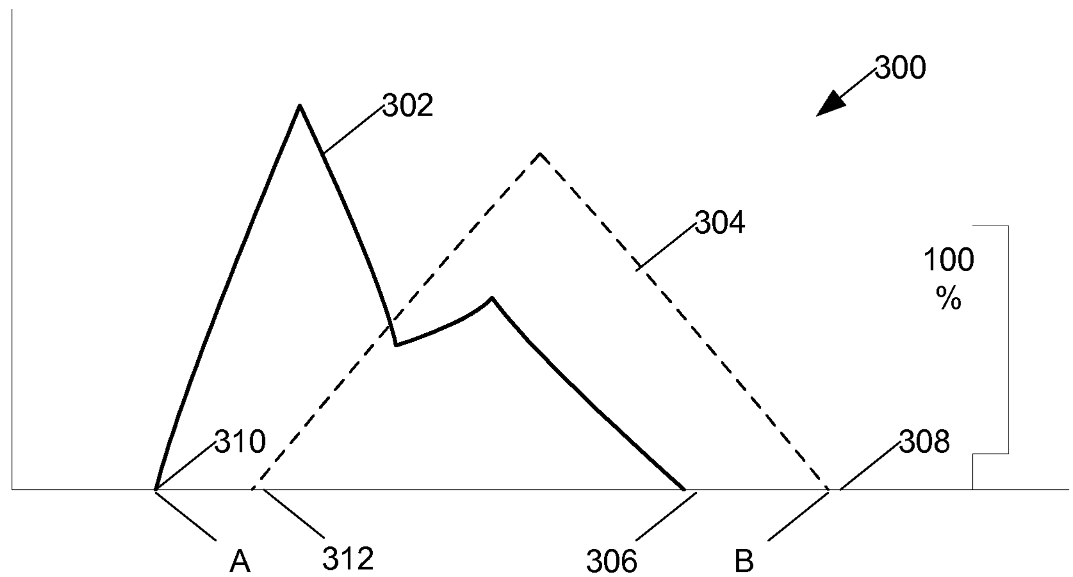
FIG. 4 is an illustration of histograms of two captured images in different cameras.

In an embodiment, the statistics generated in each camera include a histogram of brightness levels of each pixel. In a particular embodiment, the parameters generated in each camera and transmitted to the master are derived from a separate histogram of brightness of the red, green, and blue color channels. An example histogram 300 of one color channel is illustrated in FIG. 4, with solid line 302 representing a histogram of that color channel in a first-camera image of a simultaneous image pair of a common scene, while dashed line 304 represents a histogram of that color channel in a second-camera image of the simultaneous image pair. The maximum brightness point 306 of the first image may be different from the maximum brightness point 308 of the second image; similarly, the minimum brightness point 310 of the first image may be different than the minimum brightness point 312 of the second image.

In a particular embodiment, in order to use the entire dynamic range available in a memory used to store the image, the master determines a minimum brightness point A of the entire scene by inspecting all local image processing parameters for that scene. For example, but not limitation, in an embodiment where each local set of parameters includes a scale factor and offset for processing according to Equation 2 above, and where the Intensity(optimized) is zero for a lowest-intensity pixel 312 (FIG. 4), the Value(pixel) of the lowest intensity pixel 312 is the Offset. Similarly, a local set of parameters determined from a value 308 of a maximum pixel in that camera provides a full range stored intensity (Intensity(full range)), the maximum pixel value may be determined as:

Intensity(full range)/Scale Factor+Offset=Value (maximum pixel) (Equation 3)

The full-image maximum B and minimum A pixel values (FIG. 4) are determined by comparing values of maximum and minimum pixel values extracted from local parameters sent to the master or host from each camera, and the full-image scale factor and offset determined 215 from the full-image maximum B and minimum A values.

Once full-image maximum B and minimum A values are determined, a combined or composite set of image processing parameters can be determined for processing the entire scene as viewed by all cameras of the system such that the maximum dynamic range of available storage can be used. In an embodiment, this is done by determining a composite offset equal to A, and a scale factor equal to a full-range value divided by the difference of B and A.

In an alternative embodiment, of particular use with images to be eventually compressed with a perceptual coding algorithm, logarithmic scaling parameters are determined instead of linear scaling parameters as heretofore discussed.

In typical embodiments, the composite image processing parameters are derived from each set of local image processing parameters determined by cameras of the system, and the composite parameters are different from the local parameters local parameters are identical.

In a particular embodiment, one or more parameters of the combined or composite image processing parameters are derived by averaging corresponding parameters from each set of parameters determined by a camera of the system. For example, but not limitation, in this embodiment, a red color balance adjustment parameter is determined by averaging red color balance adjustment parameters from each camera of the system. This averaging process ensures that the composite image processing parameters are derived from multiple sets of local image processing parameters, and that the composite image processing parameters differ from local parameters unless the local parameters are identical.

These determined scaling parameters are among the adjustment parameters transmitted from the master to each camera, and used by each camera to adjust the images before the images are transmitted to the host for final stitching.

Combinations of Features

A method designated A for coordinated adjustment of images captured by at least a first and a second camera, the images suitable for stitching on a host, including capturing a first image in the first camera and a second image in the second camera; determining a first set of image processing parameters from the first image; determining a second set of image processing parameters from the second image; determining a master, the master comprising the host if the first camera is able to communicate with the host, and the master comprising the second camera if the first camera is unable to communicate with the host; transmitting the first set of image processing parameters to the master; determining a set of composite image processing parameters from at least the first and second sets of image processing parameters, the composite image processing parameters being derived from both the first and second sets of image processing parameters, and the composite image processing different from both the first and second sets of image processing parameters unless the first and second sets are identical; transmitting the set of composite image processing parameters to the first camera; using a processor of the first camera to apply the set of composite image processing parameters to the first image to form a first preprocessed image; and using a processor of the second camera to apply the set of composite image processing parameters to the second image to form a second preprocessed image.

A method designated AA including the method designated A and further including transmitting the first and second preprocessed images to the host; and performing, on the host, stitching of the first and second preprocessed images to form a stitched image.

A method designated AB including the method designated A or AA wherein the first set of parameters is determined from statistics comprising at least one histogram derived from the first image.

A method designated AC including the method designated AB wherein the first set of parameters include dynamic range scaling parameters determined from the at least one histogram.

A method designated AD including the method designated A, AA, AB, or AC wherein the parameters include color balance adjustment parameters.

A method designated ADA including the method designated AD wherein the parameters include a color correction matrix.

A method designated ADB including the method designated AD wherein the parameters include a color temperature.

An apparatus designated B for generating stitched images including a first and a second camera, each camera further including: a processor; a memory system coupled to the processor, the memory system including a firmware memory; a communications subsystem coupled to the processor, a coordination firmware and an image adjustment firmware in the firmware memory, the coordination firmware of each camera includes machine readable instructions for transmitting a first set image processing parameters derived from an image captured by the camera to a master, and receiving a set of image processing parameters from the master. The image adjustment firmware of each camera includes machine readable instructions for using the received set of image processing parameters to perform at least one of color-balance adjustment, contrast adjustment, and brightness adjustment.

An apparatus designated BA including the apparatus designated B wherein the image processing parameters derived from an image are derived from statistics comprising a histogram derived from the image.

An apparatus designated BB including the apparatus designated B or BA wherein the image processing parameters include color balance adjustment parameters.

An apparatus designated BC including the apparatus designated B, BA, or BB wherein the coordination firmware of each of the first and second cameras further includes machine readable instructions for determining a master camera of the first and second cameras, and, in the determined master camera, for receiving a second set of image processing parameters from a camera other than the master camera, determining a composite set of image processing parameters from both the first set of image processing parameters and the second set of image processing parameters, and transmitting the composite parameters to the other camera.

An apparatus designated BD including the apparatus designated B, BA, BB, or BC, wherein the coordination firmware further comprises machine readable instructions configured to determine whether the system is in a dominant camera mode, and if the system is in a dominant camera mode for providing a set of parameters provided by the dominant camera to other cameras of the system in lieu of the composite parameters.

An apparatus designated BE including the apparatus designated B, BA, BB, BC, or BD wherein the composite parameters include color balance adjustment parameters.

An apparatus designated BEA including the method designated BE wherein the composite parameters include a color correction matrix.

An apparatus designated BEB including the method designated BE wherein the composite parameters include a color temperature.

An apparatus designated BF including the apparatus designated B, BA, BB, BC, BD, or BE further including a host having host coordination firmware that comprises machine readable instructions for: receiving the first set of image processing parameters from the first camera and a second set of image processing parameters from the second camera, determining a combined set of image processing parameters from the first and second sets of image processing parameters, and transmitting the composite parameters to the first and second camera.

Certain changes may be made in the above methods and systems without departing from the scope of the disclosure herein, it is intended that all matter contained in the above description or shown in the accompanying drawings be interpreted as illustrative and not in a limiting sense. Those skilled in the art should appreciate that the image scaling and color balancing as described herein, may be constructed, connected, arranged, and/or combined in ways that are equivalent to what is shown.

What is claimed is:

1. A method for coordinated adjustment of images captured by a first and a second camera, the images suitable for stitching on a host, comprising:

capturing a first image in the first camera and a second image in the second camera;

determining a first set of image processing parameters from the first image;

determining a second set of image processing parameters from the second image;

determining whether the first camera is able to communicate with the host;

determining a master, the master comprising the host if the first camera is able to communicate with the host, and the master comprising the second camera if the first camera is unable to communicate with the host;

transmitting the first set of image processing parameters to the master;

determining a set of composite image processing parameters from at least the first and second sets of image processing parameters, the composite image processing parameters being derived from both the first and second sets of image processing parameters, and the composite image processing different from both the first and second sets of image processing parameters unless the first and second sets are identical;

transmitting the set of combined image processing parameters to the first camera;

using a processor of the first camera to apply the composite image processing parameters to the first image to form a first preprocessed image; and using a processor of the second camera to apply the composite image processing parameters to the second image to form a second preprocessed image.

2. The method of claim 1 further comprising transmitting the first and second preprocessed images to the host; and performing, on the host, stitching of the first and second preprocessed images to form a stitched image.

3. The method of claim 1 wherein the first set of parameters is derived from statistics comprising at least one histogram derived from the first image.

4. The method of claim 3 wherein the first set of parameters include dynamic range scaling parameters determined from the at least one histogram.

5. The method of claim 4 wherein the composite parameters include color balance adjustment parameters.

6. The method of claim 5 wherein the composite parameters include a color correction matrix.

7. The method of claim 5 wherein the composite parameters include a color temperature.

8. The method of claim 1 further comprising transmitting the first and second preprocessed images to the host; and performing, on the host, stitching of the first and second preprocessed images to form a stitched image.

9. The method of claim 1 wherein the adjustment parameters include color balance adjustment parameters.

10. An apparatus for generating stitched images comprising:

a first and a second camera, each camera further comprising:

a processor;

a memory system coupled to the processor, the memory system comprising a firmware memory;

a communications subsystem coupled to the processor, a coordination firmware in the firmware memory, the coordination firmware comprising machine readable instructions for:

determining whether a host is present, and if the host is present selecting the host as a master;

if the host is not present, designating a camera of the first and second cameras as master;

transmitting a first set of image processing parameters derived from an image captured by the camera to the master, and receiving a composite set of image processing parameters from the master; and image adjustment firmware in the firmware memory, the image adjustment firmware comprising machine readable instructions for using the composite set of image processing parameters to perform at least one of color-balance adjustment, contrast adjustment, and brightness adjustment.

11. The apparatus of claim 10 wherein the first set of image processing parameters comprise parameters derived from a histogram derived from the image.

12. The apparatus of claim 10 wherein the composite parameters include color balance adjustment parameters.

13. An apparatus for generating stitched images comprising:

a first and a second camera, each camera further comprising:

a processor;

a memory system coupled to the processor, the memory system comprising a firmware memory;

a communications subsystem coupled to the processor, a coordination firmware in the firmware memory, the coordination firmware comprising machine readable instructions for:

transmitting a first set of image processing parameters derived from an image captured by the camera to a master, and receiving a set of image processing parameters from the master; and image adjustment firmware in the firmware memory, the image adjustment firmware comprising machine readable instructions for using the image processing parameters to perform at least one of color-balance adjustment, contrast adjustment, and brightness adjustment;

wherein the coordination firmware of each of the first and second cameras further comprises machine readable instructions for:

determining a master camera of the first and second cameras, in the determined master camera, receiving a second set of image processing parameters from another camera other than the master camera, determining a composite set of parameters from the first set of image processing parameters and the second set of image processing parameters, and transmitting the composite parameters to the other camera.

14. The apparatus of claim 13 wherein the first set of image processing parameters comprise parameters derived from a histogram derived from the image.

15. The apparatus of claim 13 wherein the image processing parameters include color balance adjustment parameters.

16. The apparatus of claim 13 wherein the coordination firmware further comprises machine readable instructions configured to determine whether the system is in a dominant camera mode, and if the system is in a dominant camera mode for providing a set of parameters provided by the dominant camera to other cameras of the system in place of the composite parameters.

17. The apparatus of claim 10 further comprising a host having host coordination firmware that comprises machine readable instructions for:

receiving the first set image processing parameters from the first camera and a second set of image processing parameters from the second camera, determining a composite set of image processing parameters from the first and second sets of image processing parameters, and transmitting the parameters for adjustment of the image to the first and second camera.

18. The apparatus of claim 17 wherein the first set of image processing parameters include parameters derived from a histogram derived from the image.

19. The apparatus of claim 18 wherein the composite parameters include color balance adjustment parameters.

* * * * *